US009454027B2

(12) United States Patent
Lee et al.

(10) Patent No.: US 9,454,027 B2
(45) Date of Patent: Sep. 27, 2016

(54) LIQUID CRYSTAL DISPLAY AND METHOD OF FABRICATING THE SAME

(71) Applicant: Samsung Display Co., Ltd., Yongin, Gyeonggi-Do (KR)

(72) Inventors: Baek Hee Lee, Yongin-si (KR); Nam Seok Roh, Seongnam-si (KR); Hae Il Park, Seoul (KR); Mun Ki Sim, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/508,892

(22) Filed: Oct. 7, 2014

(65) Prior Publication Data

US 2015/0346554 A1    Dec. 3, 2015

(30) Foreign Application Priority Data

May 27, 2014   (KR) .................. 10-2014-0063755

(51) Int. Cl.
| | |
|---|---|
| G02F 1/13 | (2006.01) |
| G02F 1/1333 | (2006.01) |
| G02F 1/1335 | (2006.01) |
| G02F 1/137 | (2006.01) |

(52) U.S. Cl.
CPC ..... *G02F 1/133377* (2013.01); *G02F 1/13725* (2013.01); *G02F 1/133514* (2013.01); *G02F 2203/02* (2013.01)

(58) Field of Classification Search
CPC ....... G02F 2001/133614; G02F 2001/133622; G02F 2001/133623; G02F 1/133617; G02F 1/133621; G02F 1/133377
See application file for complete search history.

(56) References Cited

U.S. PATENT DOCUMENTS

| | | | | |
|---|---|---|---|---|
| 4,830,469 | A | * | 5/1989 | Breddels ............. G02F 1/13725 349/165 |
| 5,629,783 | A | * | 5/1997 | Kanbara ............... G02F 1/1334 349/116 |
| 5,699,135 | A | * | 12/1997 | Hisatake ........... G02F 1/133504 349/106 |
| 2011/0261301 | A1 | | 10/2011 | Noh et al. |
| 2012/0088320 | A1 | | 4/2012 | Hwang et al. |
| 2012/0162596 | A1 | | 6/2012 | Chen |

(Continued)

FOREIGN PATENT DOCUMENTS

| | | | |
|---|---|---|---|
| JP | 09015656 A | * | 1/1997 |
| JP | 09043586 A | * | 2/1997 |

(Continued)

OTHER PUBLICATIONS

Lin, Yi-Hsin, Ren, Hongwen, Wu, Yung-Hsun, Li, Wang-Yang, Liang, Xiao, and Wu, Shin-Tson. P-152: High Performance Reflective and Transflective Displays Using Guest-Host Liquid Crystal Gels. SID 06 Digest, 2006, pp. 780-782.

(Continued)

*Primary Examiner* — Mariceli Santiago
(74) *Attorney, Agent, or Firm* — Innovation Counsel LLP

(57) ABSTRACT

A liquid crystal display (LCD) comprises a light source configured to provide a first light having a first wavelength, a first wavelength conversion layer configured to convert the first light into a second light having a second wavelength longer than the first wavelength, and a first optical shutter which overlaps the first wavelength conversion layer, is configured to adjust transmittance of the first light or the second light, and comprises liquid crystal molecules and dichromatic dye.

14 Claims, 19 Drawing Sheets

(56) References Cited

U.S. PATENT DOCUMENTS

2012/0287381 A1    11/2012  Li et al.
2013/0329169 A1*   12/2013  Kim .................. G02F 1/133528
                                                        349/96

FOREIGN PATENT DOCUMENTS

| JP | 09061854 A | * | 3/1997 |
| JP | 11-015026 | | 1/1999 |
| JP | 2010-145762 | | 7/2010 |
| JP | 2013254071 A | * | 12/2013 |
| KR | 1020110115509 A | | 10/2011 |
| KR | 1020120026880 A | | 3/2012 |
| KR | 1020130000506 A | | 1/2013 |
| KR | 1020130140462 A | | 12/2013 |

OTHER PUBLICATIONS

Deshmukh, R.R. and Malik, M.K. Effect of Dichroic Dye on Phase Separation Kinetics and Electro-Optical Characteristics of Polymer Dispersed Liquid Crystals. Journal of Physics and Chemistry of Solids, 2013, pp. 215-224, vol. 74, Elsevier Ltd.

* cited by examiner

LIQUID CRYSTAL DISPLAY AND METHOD OF FABRICATING THE SAME

This application claims priority from Korean Patent Application No. 10-2014-0063755 filed on May 27, 2014 in the Korean Intellectual Property Office, the disclosure of which is incorporated herein by reference in its entirety.

BACKGROUND

1. Field

The present application relates to a liquid crystal display (LCD) and a method of fabricating the same.

2. Description of the Related Art

Liquid crystal displays (LCDs) are one of the most widely used types of flat panel displays (FPDs).

Generally, in an LCD, two polarizers are placed on and under a liquid crystal layer in order to adjust the amount of light that transmits through the liquid crystal layer. The two polarizers interact with the liquid crystal layer and thus serve as shutters that adjust the amount of light that transmits through the liquid crystal layer in the LCD.

In addition, the LCD requires a light source because liquid crystals cannot emit light by themselves. Generally, a light source used in an LCD provides white light, and the white light is converted into light of a particular color using a color filter.

However, a polarizer and a color filter absorb part of light that passes therethrough, resulting in an optical loss of an LCD. For example, one polarizer absorbs approximately half of the light that passes therethrough, and one color filter absorbs approximately a third of the light that passes therethrough.

SUMMARY

Aspects of the inventive concept provide a liquid crystal display (LCD) which does not include a polarizer and a color filter and thus can avoid an optical loss caused by the polarizer and the color filter.

Aspects of the inventive concept also provide a method of fabricating an LCD which does not include a polarizer and a color filter and thus can avoid an optical loss caused by the polarizer and the color filter.

However, aspects of the inventive concept are not restricted to the one set forth herein. The above and other aspects of the inventive concept will become more apparent to one of ordinary skill in the art by referencing the detailed description given below.

According to an aspect of the inventive concept there is provided a liquid crystal display (LCD) comprising a light source, a first wavelength conversion layer, and a first optical shutter. The light source is configured to provide a first light having a first wavelength. The first wavelength conversion layer is configured to convert the first light into a second light having a second wavelength longer than the first wavelength. The first optical shutter overlaps the first wavelength conversion layer, is configured to adjust transmittance of the first light or the second light, and comprises liquid crystal molecules and dichromatic dye.

The first wavelength conversion layer may comprise quantum dots or a phosphor.

The LCD may further comprise a pixel electrode and a common electrode which face each other with the first optical shutter interposed therebetween, wherein light transmittance of the first optical shutter varies according to a voltage difference between the pixel electrode and the common electrode.

The LCD may further comprise a selective light pass filter which is located on a path of the second light, is configured to reflect the first light, and is configured to transmit the second light.

The LCD may further comprise a second wavelength conversion layer which is located on the same layer as the first wavelength conversion layer and is configured to convert the first light into third light having a third wavelength longer than the first wavelength and different from the second wavelength. A second optical shutter overlaps the second wavelength conversion layer, is configured to adjust transmittance of the first light or the third light, and is formed of substantially the same material as the first optical shutter.

The LCD may further comprise a selective light pass filter which is located on a path of the third light, is configured to reflect the first light, and is configured to transmit the third light.

The LCD may further comprise a transparent layer which is located on the same layer as the first wavelength conversion layer and the second wavelength conversion layer and is formed of a transparent material. A third optical shutter overlaps the transparent layer, is configured to adjust the transmittance of the first light and is formed of substantially the same material as the first optical shutter.

The LCD may further comprise a long wavelength pass filter which is located on a path of the second light and a path of the third light, is configured to reflect the first light, and is configured to transmit the second light and the third light, wherein the long wavelength pass filter is not located in an area which overlaps the transparent layer.

The LCD may further comprise a third wavelength conversion layer which is located on the same layer as the first wavelength conversion layer and the second wavelength conversion layer and is configured to convert the first light into a fourth light having a fourth wavelength longer than the first wavelength and different from the second wavelength and the third wavelength. A third optical shutter overlaps the third wavelength conversion layer is configured to adjust transmittance of the first light or the fourth light, and is formed of substantially the same material as the first optical shutter.

The LCD may further comprise a selective light pass filter which is located on a path of the fourth light, is configured to reflect the first light, and is configured to transmit the fourth light.

The light source may be configured to provide ultraviolet (UV) light or blue light.

According to another aspect of the inventive concept, there is provided an LCD comprising a first pixel area which is defined in a substrate, a first wavelength conversion layer which is located on the first pixel area and comprises quantum dots or a phosphor configured to convert a color of light incident upon the first pixel area into a first color, and a first optical shutter which overlaps the first wavelength conversion layer and comprises liquid crystal molecules and dichromatic dye.

The LCD may further comprise a pixel electrode which is located on a side of the first optical shutter, and a common electrode which is located on an other side of the first optical shutter, is insulated from the pixel electrode, and defines a cavity between the pixel electrode and the common electrode, wherein the first optical shutter is located within the cavity.

The LCD may further comprise a cover layer which covers the common electrode and seals the cavity.

The LCD may further comprise a second pixel area which is defined in the substrate and different from the first pixel area, a second wavelength conversion layer which is located on the second pixel area and comprises quantum dots or a phosphor configured to convert a color of light incident upon the second pixel area into a second color different from the first color, and a second optical shutter which overlaps the second wavelength conversion layer and is formed of substantially the same material as the first optical shutter.

The LCD may further comprise a third pixel area which is defined in the substrate and different from the first pixel area and the second pixel area, a transparent layer which is located on the third pixel area and is formed of a transparent material, and a third optical shutter which overlaps the transparent layer and is formed of substantially the same material as the first optical shutter.

The LCD may further comprise a selective light pass filter which is located between the substrate and the first wavelength conversion layer and between the substrate and the second wavelength conversion layer, is configured to reflect light of a third color, and is configured to transmit light of the first color and light of the second color, wherein the selective light pass filter is not located on the third pixel area.

According to still another aspect of the inventive concept, there is provided a method of fabricating an LCD, the method comprising forming a wavelength conversion layer, which comprises quantum dots or a phosphor, on a pixel area of a substrate, the wavelength conversion layer emitting light of a predetermined color, and forming an optical shutter which overlaps the wavelength conversion layer and comprises liquid crystal molecules and dichromatic dye.

The method may further comprise after the forming of the wavelength conversion layer, forming a pixel electrode on the wavelength conversion layer, forming a sacrificial layer on the pixel electrode, forming a common electrode on the sacrificial layer, forming a cover layer on the common electrode to cover the common electrode, and forming a cavity between the pixel electrode and the common electrode by removing the sacrificial layer, wherein the optical shutter is located within the cavity.

The method may further comprise before the forming of the wavelength conversion layer, forming a selective light pass filter, which transmits the light of the predetermined color only, on the substrate.

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION

Figure 1:
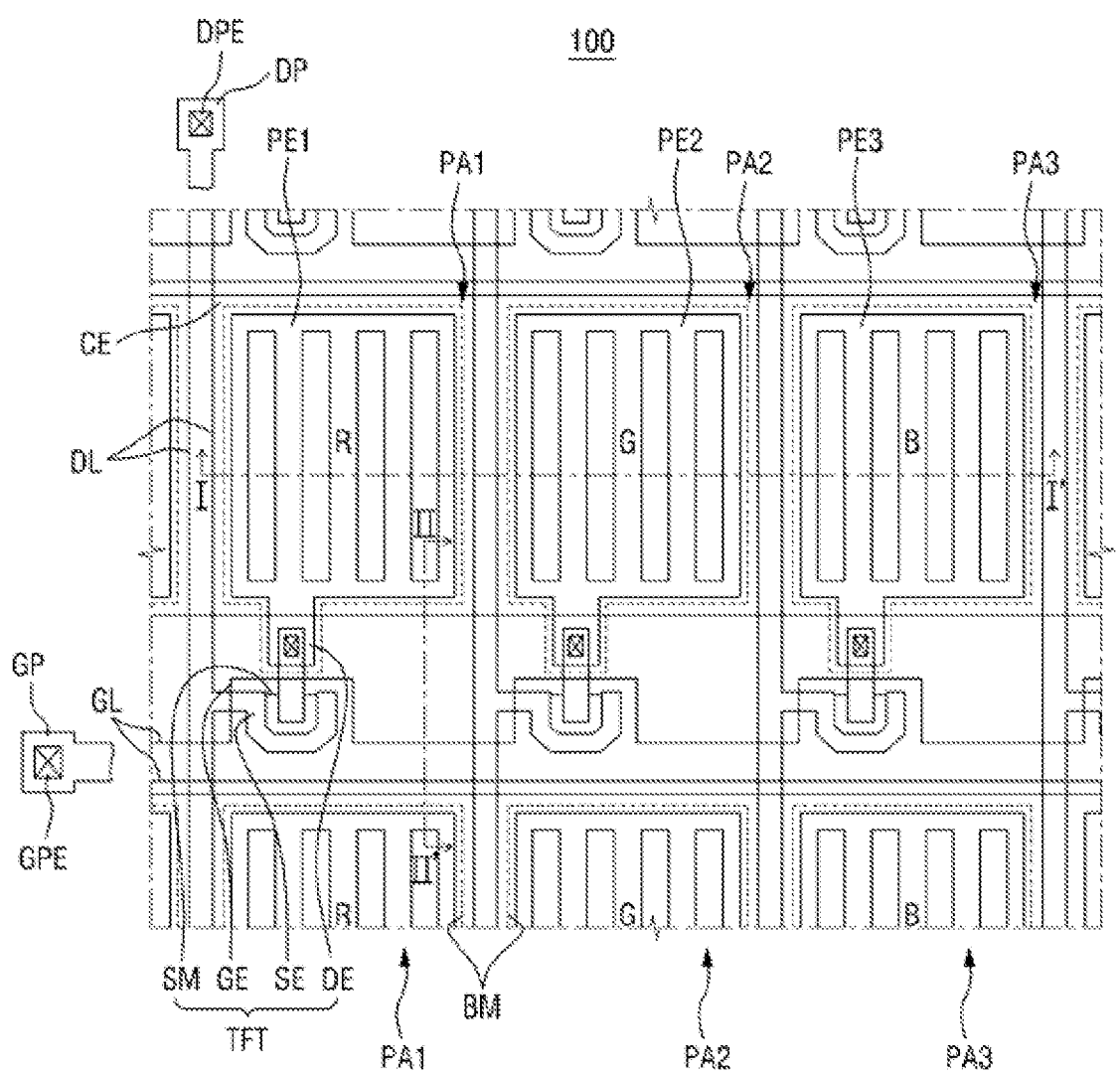
FIG. 1 is a plan view of a liquid crystal display (LCD) according to an embodiment.

The aspects and features of the inventive concept and methods for achieving the aspects and features will be apparent by referring to the embodiments to be described in detail with reference to the accompanying drawings. However, the inventive concept is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the inventive concept, and the inventive concept is only defined within the scope of the appended claims.

The term "on" that is used to designate that an element is on another element or located on a different layer or a layer includes both a case where an element is located directly on another element or a layer and a case where an element is located on another element via another layer or still another element. In the entire description, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments will be described with reference to the attached drawings.

Figure 2:
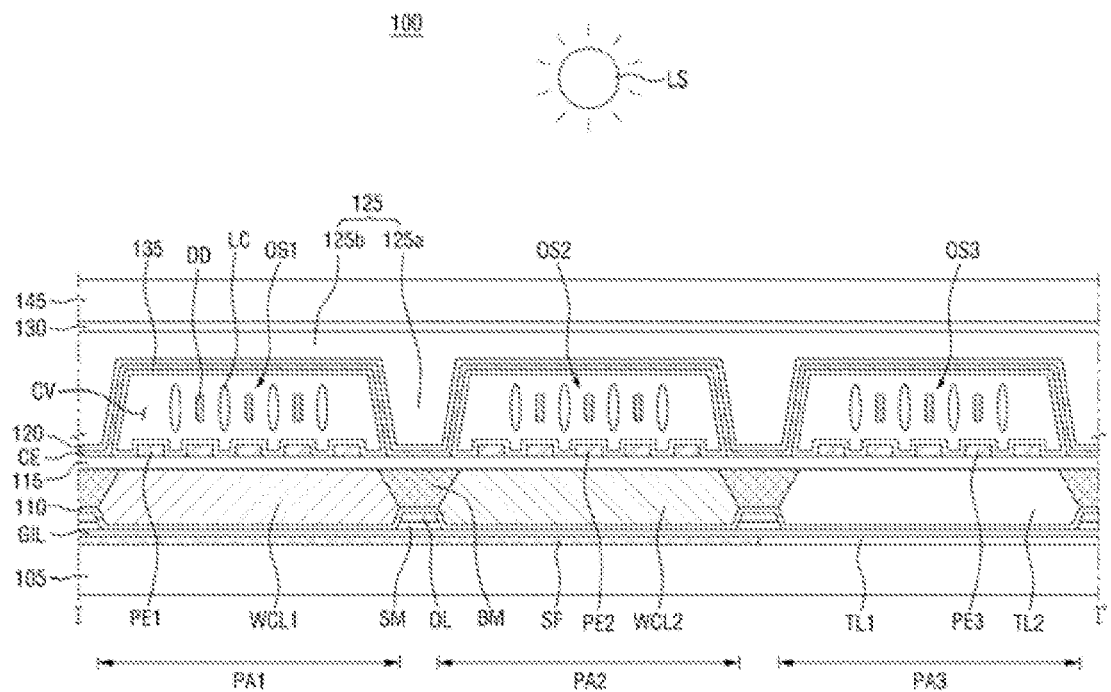
FIG. 2 is a cross-sectional view of the LCD taken along the line I-I' of FIG. 1.
Figure 3:
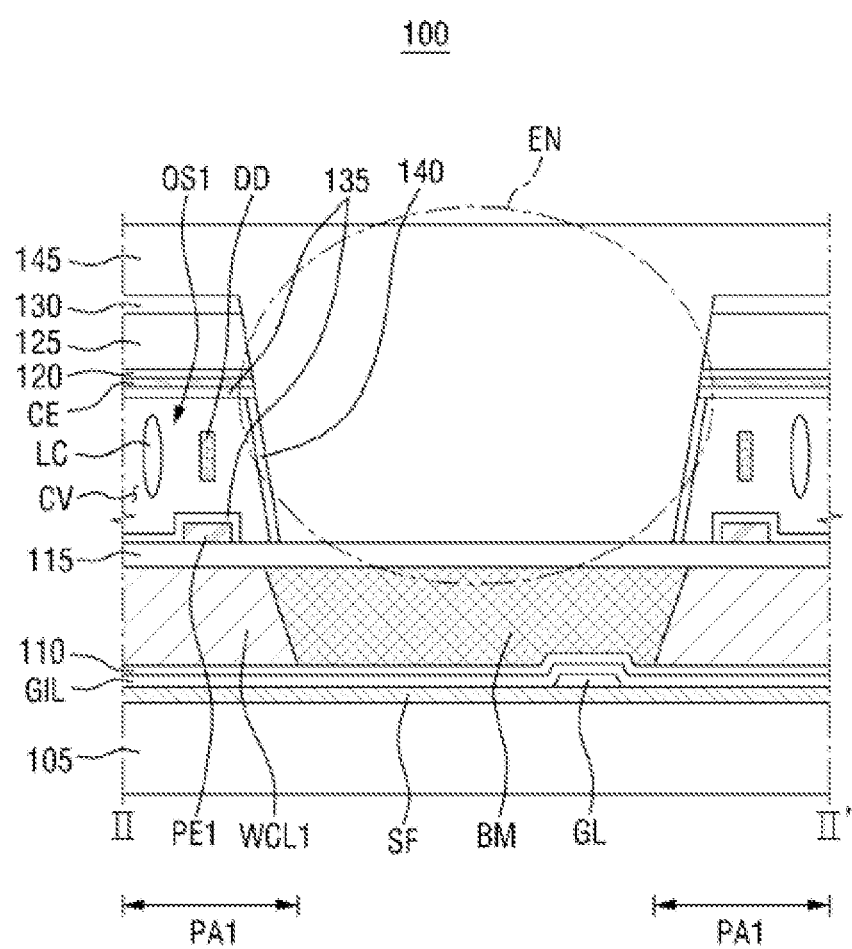
FIG. 3 is a cross-sectional view of the LCD taken along the line II-II' of FIG. 1.

FIG. 1 is a plan view of a liquid crystal display (LCD) 100 according to an embodiment. FIG. 2 is a cross-sectional view of the LCD 100 taken along the line I-I' of FIG. 1. FIG. 3 is a cross-sectional view of the LCD 100 taken along the line II-II' of FIG. 1.

Referring to FIGS. 1 through 3, the LCD 100 may include a substrate 105, a selective light pass filter SF, a first transparent layer TL1, a gate line GL, a data line DL, a gate insulating layer GIL, a thin film transistor TFT, an insulating layer 110, a plurality of wavelength conversion layers WCL1, WCL2, a second transparent layer TL2, a black matrix BM, a first passivation layer 115, a plurality of pixel electrodes PE1 through PE3, a common electrode CE, a second passivation layer 120, a cover layer 125, a third passivation layer 130, an alignment layer 135, a plurality of optical shutters OS1 through OS3, a sealing layer 140, a planarization layer 145, and a light source LS.

The substrate 105 may be a transparent insulating substrate and have a plurality of pixel areas PA1 through PA3, each defined by the gate line GL and the data line DL. The pixel areas PA1 through PA3 may be arranged in a matrix. In an exemplary embodiment, the pixel areas PA1 through PA3 may include a first pixel area PA1 which emits light of a first color, a second pixel area PA2 which emits light of a second color different from the first color, and a third pixel area PA3 which emits light of a third color different from the first color and the second color. Here, the first color, the second color, and the third color may respectively be, but are not limited to, red, green, and blue.

The selective light pass filter SF may be located on the substrate 105. The selective light pass filter SF may transmit light of a specific wavelength region only and reflect light of wavelength regions other than the specific wavelength region. In an exemplary embodiment, the selective light pass filter SF may be a long wavelength pass filter that transmits light of a long wavelength region only and reflects light of a short wavelength region. Specifically, the selective light pass filter SF may transmit red light and green light (light having a wavelength of approximately 500 to 700 nm) and reflect blue light.

The selective light pass filter SF may include an alternate stack of a first thin film having a predetermined refractive index and a second thin film having a refractive index higher than the refractive index of the first thin film. The reflectivity of blue light can be increased by increasing the number of the above alternate stacks. In another embodiment, the selective light pass filter SF may also include dye that absorbs light of a specific wavelength region.

The selective light pass filter SF may be located on the first pixel area PA1 and the second pixel area PA2. In addition, the selective light pass filter SF may not be located on the third pixel area PA3. In an exemplary embodiment, the selective light pass filter SF may be formed on the whole surface of the substrate 105 but may not be formed on a portion of the substrate 105 which corresponds to the third pixel area PA3. In another exemplary embodiment, the selective light pass filter SF may be formed on a portion of the substrate 105 which corresponds to the first pixel area PA1 and the second pixel area PA2 only.

The first transparent layer TL1 may be located on the third pixel area PA3 of the substrate 105. The first transparent layer TL1 may be located on the same layer as the selective light pass filter SF. The first transparent layer TL1 may be formed of a transparent material. For example, the first transparent layer TL1 may be formed of transparent photoresist. The first transparent layer TL1 may be formed at the same time as the selective light pass filter SF using a half-tone mask. In an exemplary embodiment, the first transparent layer TL1 can be omitted.

The gate line GL is formed on the substrate 105 to extend along a first direction and delivers a gate signal. An end of the gate line GL is connected to a gate pad GP. A gate pad electrode GPE may be formed on the gate pad GP. The gate pad electrode GPE is a contact electrode that connects the gate line GL and external wiring for transmitting signals to the pixel electrodes PE1 through PE3.

The data line DL is formed on the substrate 105 to extend along a second direction intersecting the first direction. The data line DL is insulated from the gate line GL and delivers a data signal. An end of the data line DL is connected to a data pad DP. A data pad electrode DPE may be formed on the data pad DP. The data pad electrode DPE is another contact electrode that connects the data line DL and external wiring for transmitting signals to the pixel electrodes PE1 through PE3.

A gate insulating layer GIL covers the gate line GL and the gate pad GP formed on the surface of the substrate 105 and is formed of an insulating material. The gate insulating layer GIL may include, e.g., silicon nitride or silicon oxide. In addition, the data line DL and the data pad DP may be formed on the gate insulating layer GIL.

A thin-film transistor TFT includes a gate electrode GE, a semiconductor layer SM, a source electrode SE, and a drain electrode DE.

When viewed from above, the gate electrode GE may protrude from the gate line GL toward the semiconductor layer SM. The gate electrode GE may include any one of indium tin oxide (ITO), indium zinc oxide (IZO), and indium tin zinc oxide (ITZO). In addition, the gate electrode GE may have a double layer structure consisting of a first electrode layer formed of any one of the above materials and a second electrode layer formed of any one of the following materials. The second electrode layer may be a metal such as copper (Cu), molybdenum (Mo), aluminum (Al), tungsten (W), chrome (Cr) or titanium (Ti), or an alloy containing at least one of the above metals.

The semiconductor layer SM is formed on the gate electrode GE with the gate insulating layer GIL interposed therebetween. The semiconductor layer SM may include an active layer provided on the gate insulting layer GIL and an ohmic contact layer provided on the active layer. Here, the active layer may be formed of amorphous silicon, microcrystalline silicon, polycrystalline silicon, or oxide semiconductor. The semiconductor layer SM may be formed between the data line DL and the gate insulating layer GIL. In addition, the semiconductor layer SM may be formed between the data pad DP and the gate insulating layer GIL.

The source electrode SE protrudes from the data line DL and overlaps at least part of the gate electrode GE when viewed from above. The drain electrode DE is separated from the source electrode SE and overlaps at least part of the gate electrode GE when viewed from above. Each of the source electrode SE and the drain electrode DE may be a metal such as Cu, Mo, Al, W, Cr or Ti, or an alloy containing at least one of the above metals. The source electrode SE and the drain electrode DE partially overlap the semiconductor layer SM in an area excluding an area between the source electrode SE and the drain electrode DE.

The insulating layer 110 is formed on the gate insulating layer GIL and has through holes that expose the drain electrode DE, the gate pad GP, and the data pad DP. The insulating layer 110 may include, for example, silicon nitride or silicon oxide.

The wavelength conversion layers WCL1 and WCL2 may be located on the insulating layer 110. The wavelength conversion layers WCL1 and WCL2 may correspond to the pixel areas PA1 and PA2, respectively. The wavelength conversion layers WCL1 and WCL2 may convert the wavelength of light provided from the light source LS. In an exemplary embodiment, the wavelength conversion layers WCL1 and WCL2 are referred to as a first wavelength conversion layer WCL1 and a second wavelength conversion layer WCL2.

The first wavelength conversion layer WCL1 may be located on the first pixel area PA1 of the substrate 105. The first wavelength conversion layer WCL1 may receive first light having a first wavelength from the light source LS and output a second light having a second wavelength longer than the first wavelength. Here, the first light may be, but is not limited to, blue light, and the second light may be, but is not limited to, red light. The selective light pass filter SF may be located on a path of the second light.

The first wavelength conversion layer WCL1 may include a phosphor corresponding to the first color (e.g., red), quantum dots corresponding to the first color, or a combination of the same. That is, the color of light that passes through the first wavelength conversion layer WCL1 may be converted into the first color.

The phosphor may be a typical organic or inorganic phosphor. In an exemplary embodiment, the phosphor may be, but is not limited to, a YAG-based fluorescent material, a silicate-based fluorescent material, an oxynitride fluorescent material, or a combination of the same.

The quantum dots are semiconductor nanoparticles having a core-shell structure and are several to tens of nanometers (nm) in size. The quantum dots emit different light according to their particle size due to the quantum quanfinement effect. More specifically, the quantum dots generate strong light in a narrow wavelength band, and the light emission of the quantum dots occurs when unstable (excited) electrons fall from a conduction band to a valence band. The quantum dots tend to generate light having a shorter wavelength when their particle size is smaller and generate light having a longer wavelength when their particle size is larger. Therefore, light of all desired visible wavelengths can be generated by controlling the size of the quantum dots.

A quantum dot may include any one nanocrystal selected from the group consisting of a Si nanocrystal, a group II-VI compound semiconductor nanocrystal, a group III-V compound semiconductor nanocrystal, a group IV-VI compound semiconductor nanocrystal, and a mixture of the same.

The group II-VI compound semiconductor nanocrystal may be any one selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe.

The group III-V compound semiconductor nanocrystal may be any one selected from the group consisting of GaPAs, AlnP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The group IV-VI compound semiconductor nanocrystal may be SbTe.

The first wavelength conversion layer WCL1 may include not only a wavelength conversion material such as a phosphor and quantum dots but also a dispersive medium which disperses the wavelength conversion material. That is, the phosphor or the quantum dots may be dispersed in a dispersive medium, such as an organic solvent or a polymer resin, in such a manner as to be naturally disposed therein. The dispersive medium may be any transparent medium that does not affect the wavelength conversion performance of the phosphor and the quantum dots, does not reflect light, and does not cause optical absorption.

The organic solvent may include at least one of toluene, chloroform, and ethanol. The polymer resin may include at least one of epoxy, polystyrene, and acrylate.

The first wavelength conversion layer WCL1 may include an ultraviolet (UV) initiator, a thermosetting additive, a crosslinker, a dispersing agent and a combination of the same, in addition to the dispersive medium. The first wavelength conversion layer WCL1 including a mixture of the wavelength conversion material and the above additives may be located on the substrate 105.

The second wavelength conversion layer WCL2 may be located on the second pixel area PA2 of the substrate 105. The second wavelength conversion layer WCL2 may be located on the same layer as the first wavelength conversion layer WCL1. The second wavelength conversion layer WCL2 may receive the first light having the first wavelength from the light source LS and output a third light having a third wavelength longer than the first wavelength and different from the second wavelength. Here, the first light may be, but is not limited to, blue light, and the third light may be, but is not limited to, green light. The selective light pass filter SF may be located on a path of the third light.

The second wavelength conversion layer WCL2 may include a phosphor corresponding to the second color (e.g., green), quantum dots corresponding to the second color, or a combination of the same. That is, the color of light that passes through the second wavelength conversion layer WCL2 may be converted into the second color. The second wavelength conversion layer WCL2 may be formed of substantially the same material as the first wavelength conversion layer WCL1 except that it includes a wavelength conversion material corresponding to green.

The second transparent layer TL2 may be located on the insulating layer 110. The second transparent layer TL2 may be located on the third pixel area PA3 of the substrate 105. The second transparent layer TL2 may be located on the same layer as the first wavelength conversion layer WCL1 and the second wavelength conversion layer WCL2. The second transparent layer TL2 may be formed of a transparent material. For example, the second transparent layer TL2 may be formed of transparent photoresist. The second transparent layer TL2 may be formed at the same time as the first wavelength conversion layer WCL1 and the second wavelength conversion layer WCL2 using a half-tone mask. In an exemplary embodiment, the second transparent layer TL2 can be omitted.

In summary, the selective light pass filter SF may be located on the first pixel area PA1 and the second pixel area PA2, and the first transparent layer TL1 may be located on the third pixel area PA3. In addition, the first pixel area PA1 and the second pixel area PA2 may respectively be located on the first wavelength conversion layer WCL1 and the second wavelength conversion layer WCL2, and the second transient layer TL2 may be located on the third pixel area PA3. Accordingly, in the first pixel area PA1, blue light provided from the light source LS may be converted into red light by the first wavelength conversion layer WCL1, and a portion of the blue light which fails to be converted into the red light is filtered out by the selective light pass filter SF. Therefore, high-purity red light can be emitted. In the second pixel area PA2, the blue light provided from the light source LS may be converted into green light by the second wavelength conversion layer WCL2, and a portion of the blue light which fails to be converted into the green light is filtered out by the selective light pass filter SF. Therefore, high-purity green light can be emitted. In the third pixel area PA3, the blue light provided from the light source LS is emitted without conversion via the second transparent layer TL2 and the first transparent layer TL1. Therefore, high-purity blue light can be emitted.

Figure 4:
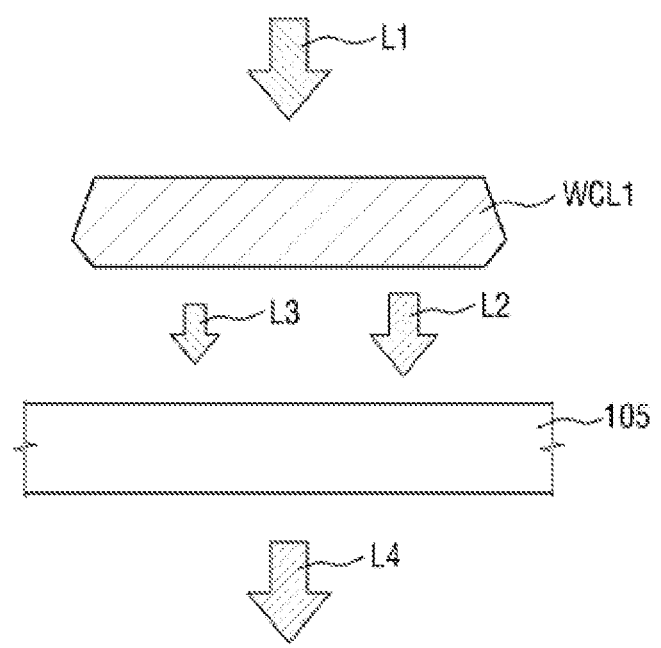
FIGS. 4 and 5 are conceptual diagrams illustrating the functions of a first wavelength conversion layer and a selective light pass filter.
Figure 5:
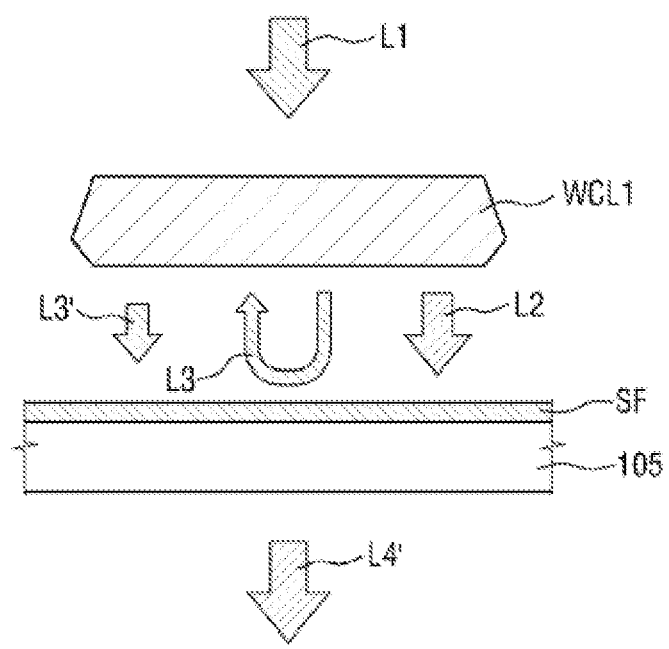

Specific examples of the functions of the first wavelength conversion layer WCL1 and the selective light pass filter SF will now be described in greater detail with reference to FIGS. 4 and 5. FIGS. 4 and 5 are conceptual diagrams illustrating the functions of the first wavelength conversion layer WCL1 and the selective light pass filter SF. The functions of the second wavelength conversion layer WCL2 and the selective light pass filter SF are substantially the same as those of the first wavelength conversion layer WCL1 and the selective light pass filter SF, and thus a description thereof will be omitted.

Specifically, FIG. 4 is a conceptual diagram illustrating light in the first pixel area PA1 in the absence of the selective light pass filter SF. When the light source LS provides blue light L1, the first wavelength conversion layer WCL1 may convert most of the blue light L1 into red light L2. However, a portion of the blue light L1 may emerge from the first wavelength conversion layer WCL1 without being converted by the first wavelength conversion layer WCL1. This portion of the blue light L1 will be referred to as unconverted blue light L3. The unconverted blue light B3 is mixed with the red light L2 to produce mixed light L4. The mixed light L4 may be purple because it contains the red light L2 in large amounts and the unconverted blue light L3 in small amounts. The purple mixed light L4 passes through the substrate 105 to be perceived by a user. Thus, the user cannot perceive high-purity red light.

FIG. 5 is a conceptual diagram illustrating light in the first pixel area PA1 in the presence of the selective light pass filter SF. As illustrated in FIG. 4, the blue light L1 provided from the light source LS is divided into the red light L2 and the unconverted blue light L3 as it passes through the first wavelength conversion layer WCL1. Here, the unconverted blue light L3 fails to pass through the selective light pass filter SF and is reflected back to the first wavelength conversion layer WCL1. The unconverted blue light L3 is reflected inside the LCD 100 to pass again through the first wavelength conversion layer WCL1. Accordingly, the unconverted blue light L3 may be converted into red light. The unconverted blue light L3 reflected, converted into the red light by the first wavelength conversion layer WCL1, and directed again toward the substrate 105 will be referred to as a second red light L3'. The second red light L3' is mixed with the red light L2 to produce high-purity red light L4'. The high-purity red light L4' passes through the substrate 105 to be perceived by a user.

Referring back to FIGS. 1 through 3, the black matrix BM may be formed on the insulating layer 110 at edges of each pixel area. That is, the black matrix BM may be placed to surround the wavelength conversion layers WCL1, WCL2, and the second transparent layer TL2. The black matrix BM may overlap the data lines DL and the thin-film transistor TFT. The black matrix BM is formed of a light-blocking material to block light unnecessary for forming an image.

The first passivation layer is formed on the wavelength conversion layers WCL1, WCL2, the second transparent layer TL2, and the black matrix BM and planarizes the wavelength conversion layers WCL1, WCL2, the second transparent layer TL2, and the black matrix BM. In addition, the first passivation layer 115 protects the wavelength conversion layers WCL1, WCL2, the second transparent layer TL2, and the black matrix BM. Thus, the first passivation layer 115 can prevent the wavelength conversion layers WCL1, WCL2, the second transparent layer TL2, and the black matrix BM from being damaged by an $O_2$ ashing process performed to remove residues within cavities CV in the last stage of forming the cavities CV. The first passivation layer 115 may be formed of at least any one of SiNx, SiOx, and SiOxNy.

The pixel electrodes PE1 through PE3 may be located on the first passivation layer 115. Specifically, the pixel electrodes PE1 through PE3 may be formed on the pixel areas PA1 through PA3. Each of the pixel electrodes PE1 through PE3 is connected to the drain electrode DE. The pixel electrodes PE1 through PE3 may be formed of a transparent conductive material such as ITO or IZO. The pixel electrodes PE1 through PE3 may include a first pixel electrode PE1, a second pixel electrode PE2, and a third pixel electrode PE3. The first pixel electrode PE1 may be located on the first pixel area PA1. The first pixel electrode PE1 may include at least one slit extending in a direction parallel to the gate line GL. The second pixel electrode PE2 may be located on the second pixel area PA2. The second pixel electrode PE2 may have substantially the same shape as the first pixel electrode PE1. In addition, the third pixel electrode PE3 may be located on the third pixel area PA3. The third pixel electrode PE3 may have substantially the same shape as the first pixel electrode PE1.

The cover layer 125 includes sidewalls 125a formed on the substrate 105 to define the pixel areas PA1 through PA3 and a roof 125b formed on the sidewalls 125a to connect the sidewalls 125a. The cover layer 125 forms the cavities CV between the substrate 105 and the cover layer 125. The cover layer 125 may be formed of an organic material. The cover layer 125 may further include a liquid crystal inlet EN which is formed along the first direction of the substrate 105 and located in a portion that overlaps the gate line GL. Specifically, the liquid crystal inlet EN may be formed in each pixel area on a side surface of each of the sidewalls 125a parallel to the first direction of the substrate 105, and liquid crystal molecules LC and dichromatic dye DD can be injected into each cavity CV through the liquid crystal inlet EN.

The common electrode CE is formed on a bottom surface of the cover layer 125, contacts the first passivation layer 115 on bottom surfaces of the sidewalls 125a, and is separated from the pixel electrodes PE1 through PE3 on a bottom surface of the roof 125b. The common electrode CE may be formed of a transparent conductive material such as ITO or IZO and may control the optical shutters OS1 through OS3 by generating an electric field together with the pixel electrodes PE1 through PE3. Part of the liquid crystal inlet EN may be formed by partially removing the common electrode CE.

The second passivation layer 120 is formed between the common electrode CE and the cover layer 125 and protects the common electrode CE. The second passivation layer 120 may be formed of at least any one of SiNx, SiOx, and SiOxNy. Part of the liquid crystal inlet EN may be formed by partially removing the second passivation layer 120.

The third passivation layer 130 is formed on the cover layer 125 and protects the cover layer 125. The third passivation layer 130 may be formed of at least any one of SiNx, SiOx, and SiOxNy. Part of the liquid crystal inlet EN may be formed by partially removing the third passivation layer 130.

The alignment layer 135 may be formed on the pixel electrodes PE1 through PE3 and the common electrode CE inside the cavities CV. The alignment layer 135 may be formed of an alignment material such as polyamic acid, polysiloxane, or polyimide.

The optical shutters OS1 through OS3 may be located inside the cavities CV. Specifically, the optical shutters OS1 through OS3 may be surrounded by the alignment layer 135 located within the cavities CV. The optical shutters OS1 through OS3 may be formed by injecting a material that forms the optical shutters OS1 through OS3 into the cavities CV through the liquid crystal inlets EN. The optical shutters OS1 through OS3 may include a first optical shutter OS1, a second optical shutter OS2, and a third optical shutter OS3.

The first optical shatter OS1 may be located inside the cavity CV disposed on the first pixel area PA1. In addition, the first optical shutter OS1 may overlap the first wavelength conversion layer WCL1. The first optical shutter OS1 can adjust the transmittance of the first light or the second light. The first optical shutter OS1 includes the liquid crystal molecules LC and the dichromatic dye DD. Here, the liquid crystal molecules LC may use any one of known materials. The dichromatic dye DD may use, but not limited to, a material defined by formula (1) below:

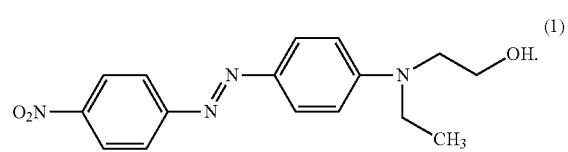 [SMILES: CCN(CCO)c1ccc(/N=N/c2ccc([N+](=O)[O-])cc2)cc1]

In addition, the first optical shutter OS1 may include the dichromatic dye DD in an amount of approximately 10% by weight or less. The dichromatic dye DD added in an amount of approximately 10% by weight or less may activate a directional factor of the liquid crystal molecules LC, thereby reducing the response time of the liquid crystal molecules LC when a voltage is applied to the first optical shutter OS1. However, the concentration of the dichromatic dye DD in the first optical shutter OS1 is not limited to the above example.

The first optical shutter OS1 may include a polymer material and/or a vertical alignment agent that supports the liquid crystal molecules LC and the dichromatic dye DD, in addition to the liquid crystal molecules LC and the dichromatic dye DD.

The second optical shutter OS2 may be located inside the cavity CV disposed on the second pixel area PA2. In addition, the second optical shutter OS2 may overlap the second wavelength conversion layer WCL2. The second optical shutter OS2 can adjust the transmittance of the first light or the third light. The second optical shutter OS2 may be formed of substantially the same material as the first optical shutter OS1.

The third optical shutter OS3 may be located inside the cavity CV disposed on the third pixel area PA3. In addition, the third optical shutter OS3 may overlap the second transparent layer TL2. The third optical shutter OS3 can adjust the transmittance of the first light. The third optical shutter OS3 may be formed of substantially the same material as the first optical shutter OS1.

Figure 6:
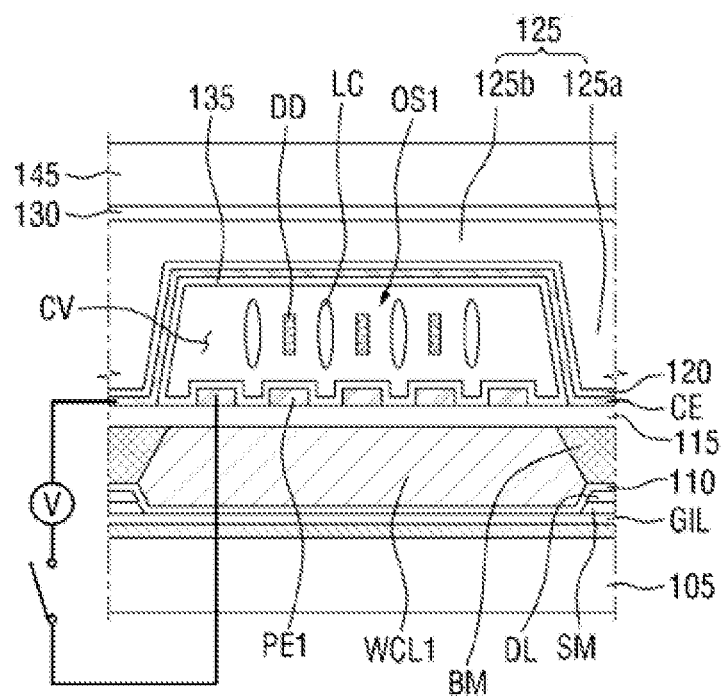
FIGS. 6 and 7 are cross-sectional views illustrating the operation of a first optical shutter according to a voltage.
Figure 7:
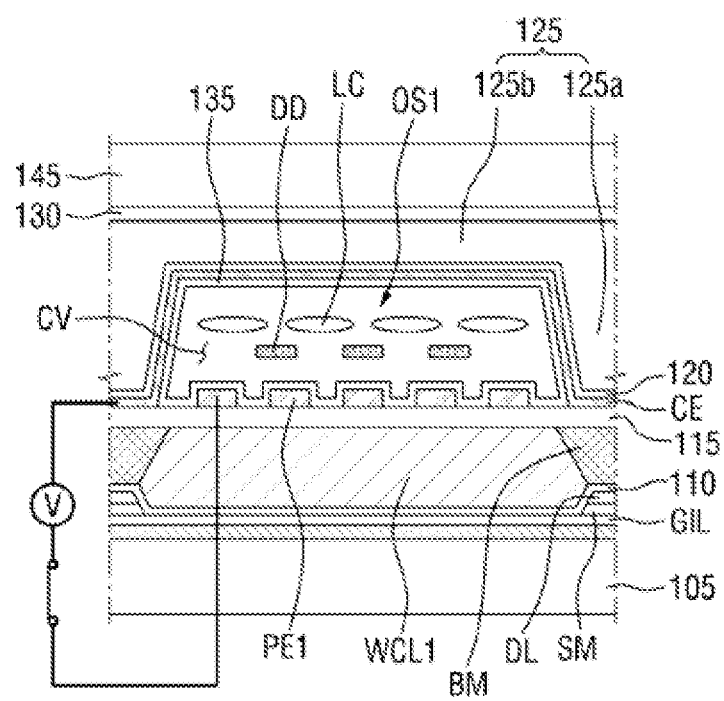

Since the optical shutters OS1 through OS3 include not only the liquid crystal molecules LC but also the dichromatic dye DD, they can perform the function of adjusting the transmittance of light provided from the light source LS. This function will now be described in greater detail with reference to FIGS. 6 and 7. FIGS. 6 and 7 are cross-sectional views illustrating the operation of the first optical shutter OS1 according to a voltage. The operations of the second optical shutter OS2 and the third optical shutter OS3 are substantially the same as the operation of the first optical shutter OS1, and thus a description thereof will be omitted.

Referring to FIG. 6, when no voltage is applied to the first optical shutter OS1, the liquid crystal molecules LC and the dichromatic dye DD of the first optical shutter OS1 may all be aligned vertically. In this case, light emitted from the light source LS can pass through the first optical shutter OS1.

Referring to FIG. 7, when a voltage is applied to the first optical shutter OS1, the liquid crystal molecules LC and the dichromatic dye DD of the first optical shutter OS1 may be aligned horizontally. In this case, light emitted from the light source LS may be blocked by the first optical shutter OS1. The dichromatic dye DD may be aligned in the same direction as the liquid crystal molecules LC.

In FIGS. 6 and 7, a case where light is completely transmitted or blocked is illustrated. However, the embodiments are not limited to this case, and a portion of light may be transmitted while the other portion of the light is blocked by adjusting the voltage applied to the first optical shutter OS1. That is, the transmittance of light provided from the light source LS can be controlled by adjusting the voltage applied to the first optical shutter OS1. In addition, in FIGS. 6 and 7, a case where light is transmitted when no voltage is applied and is blocked when a voltage is applied is illustrated. However, the embodiments are not limited to this case, and light can also be blocked when no voltage is applied and can also be transmitted when a voltage is applied.

Referring back to FIGS. 1 through 3, the sealing layer 140 is formed to close the liquid crystal inlet EN of each cavity CV. The sealing layer 140 may be formed of a sealing material that does not react with the liquid crystal molecules LC injected into each cavity CV.

The planarization layer 145 is formed on the cover layer 125 and planarizes and protects the cover layer 125 and other elements located under the cover layer 125. The planarization layer 145 may be formed of an insulating material.

Although not illustrated in the drawings, the LCD 100 may further include an encapsulation layer formed on the planarization layer 145. The encapsulation layer may negate the need for another substrate, which is coupled to the substrate 105 having the thin-film transistor TFT, from the LCD 100.

The light source LS may be located above the planarization layer 145. The light source LS may emit blue light. In an exemplary embodiment, the light source LS may be a blue light-emitting diode.

In the LCD 100 structured as described above, the thin-film transistor TFT is turned on in response to a driving signal provided through the gate line GL. When the thin-film transistor TFT is turned on, an image signal provided through the data line DL is provided to each of the pixel electrodes PE1 through PE3 via the thin-film transistor TFT. Accordingly, an electric field is formed between the pixel electrodes PE1 through PE3 and the common electrode CE, and the liquid crystal molecules LC and the dichromatic dye DD of the optical shutters OS1 through OS3 are driven by the electric field. As a result, an image is displayed.

The LCD 100 according to the current embodiment does not include a polarizer and a color filter. Therefore, an optical loss by the polarizer and the color filter can be avoided. In addition, the wavelength conversion layers WCL1, WCL2 formed of a phosphor or quantum dots can improve high color reproducibility. Further, since the optical shutters OS1 through OS3 are placed within the cavities CV formed on one sheet of substrate 105, a thin LCD 100 can be provided.

A method of fabricating an LCD according to an embodiment will now be described with reference to FIGS. 8 through 17. FIGS. 8 through 17 are cross-sectional views illustrating steps of a method of fabricating the LCD 100 of FIG. 1. For simplicity, a description of elements substantially identical to those illustrated in the above-described drawings will be omitted.

Figure 8:
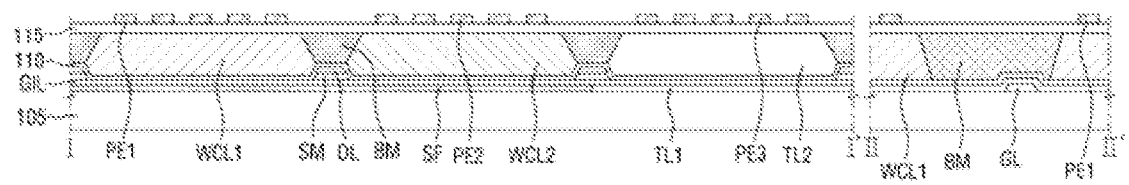
FIGS. 8, 9, 10, 11, 12, 13, 14, 15, 16, 17 are cross-sectional views illustrating steps of a method of fabricating the LCD of FIG. 1.

Referring to FIG. 8, a plurality of pixel electrodes PE1 through PE3 are formed on a stacked structure of a substrate 105, a selective light pass filter SF, a first transparent layer TL1, a gate insulating layer GIL, a thin-film transistor TFT (see FIG. 1), an insulating layer 110, a plurality of wavelength conversion layers WCL1, WCL2, the second transparent layer TL2, a black matrix BM, and a first passivation layer 115.

Specifically, the selective light pass filter SF and the first transparent layer TL1 may be formed simultaneously by a photolithography process using a half-tone mask. Here, the first transparent layer TL1 may be formed of photoresist used in the photolithography process.

Then, a conductive layer is formed using, e.g., a sputtering process and patterned using a photolithography process, thereby forming a gate line GL. Here, a gate pad GP (see FIG. 1) and a gate electrode GE (see FIG. 1) are also formed simultaneously.

The gate insulating layer GIL is formed on the substrate 105 having the gate pad GP and the gate electrode GE, e.g., by a plasma enhanced chemical vapor deposition (PECVD) process.

A semiconductor material layer and a conductive layer are sequentially stacked on the gate insulating layer GIL and patterned using a photolithography process, thereby forming a data line DL, a source electrode SE (see FIG. 1) connected to the data line DL, a drain electrode DE (see FIG. 1) separated from the source electrode SE, and a semiconductor layer SM formed in an area corresponding to an area between the source electrode SE and the drain electrode DE. Here, a data pad DP (see FIG. 1) is also formed. The gate electrode GE, the semiconductor layer SM, the source electrode SE and the drain electrode DE form the thin-film transistor TFT.

The insulating layer 110 is formed on the gate insulating layer GIL to cover the thin-film transistor TFT and the data pad DP. The insulating layer 110 is a passivation layer formed of silicon nitride or silicon oxide by a PECVD process.

The wavelength conversion layers WCL1, WCL2 and a second transparent layer TL2 may be simultaneously formed on the insulating layer 110 at positions respectively corresponding to a plurality of pixel areas PA1 through PA3 by a photolithography process using a half-tone mask. The second transparent layer TL2 may be formed of photoresist used in the photolithography process.

A black matrix BM may be formed on the insulating layer 110 at positions corresponding to edges of the pixel areas PA1 through PA3. The black matrix BM may be formed by patterning a light-blocking material using a photolithography process.

The first passivation layer 115 is formed on the wavelength conversion layers WCL1, WCL2, the second transparent layer TL2 and the black matrix BM. The first passivation layer 115 may be formed of at least any one of SiNx, SiOx and SiOxNy by a deposition process (such as PECVD) at a low temperature.

The pixel electrodes PE1 through PE3 are formed on the first passivation layer 115. The pixel electrodes PE1 through PE3 may be formed by forming a transparent conductive material layer on the first passivation layer 115 and patterning the transparent conductive material layer using a photolithography process.

Figure 9:
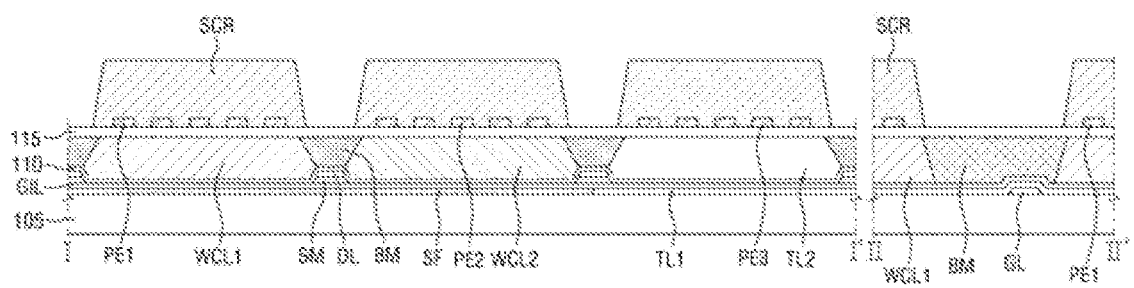

Referring to FIG. 9, a sacrificial layer SCR is formed on the substrate 105, specifically, on the first passivation layer 115 to cover each of the pixel electrodes PE1 through PE3 disposed on the pixel areas PA1 through PA3. The sacrificial layer SCR may be formed by patterning a photoresist material using a photolithography process.

Figure 10:
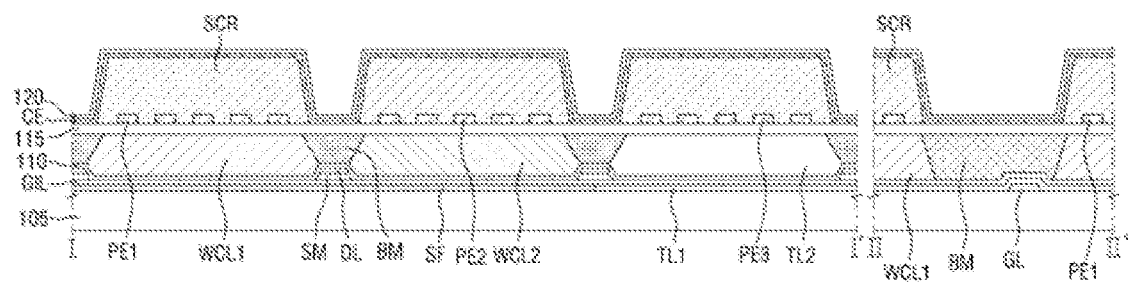

Referring to FIG. 10, a common electrode CE and a second passivation layer 120 are sequentially formed on the first passivation layer 115 having the sacrificial layer SCR. The common electrode CE may be formed of ITO or IZO by, e.g., a deposition process, and the second passivation layer 120 may be formed of at least any one of SiNx, SiOx and SiOxNy by a deposition process (such as PECVD) at a low temperature.

Figure 11:
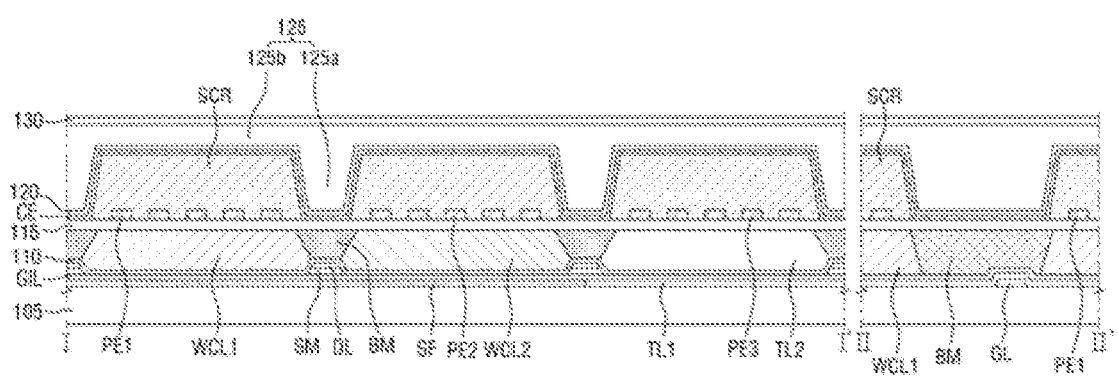

Referring to FIG. 11, a cover layer 125 is formed on the second passivation layer 120. The cover layer 125 includes sidewalls 125a which define the pixel areas PA1 through PA3 and a roof 125b which connects the side walls 125a. The cover layer 125 may be formed of an organic material. Next, a third passivation layer 130 is formed on the cover layer 125. The third passivation layer 130 may be formed of at least any one of SiNx, SiOx and SiOxNy by a deposition process (such as PECVD) at a low temperature.

Figure 12:
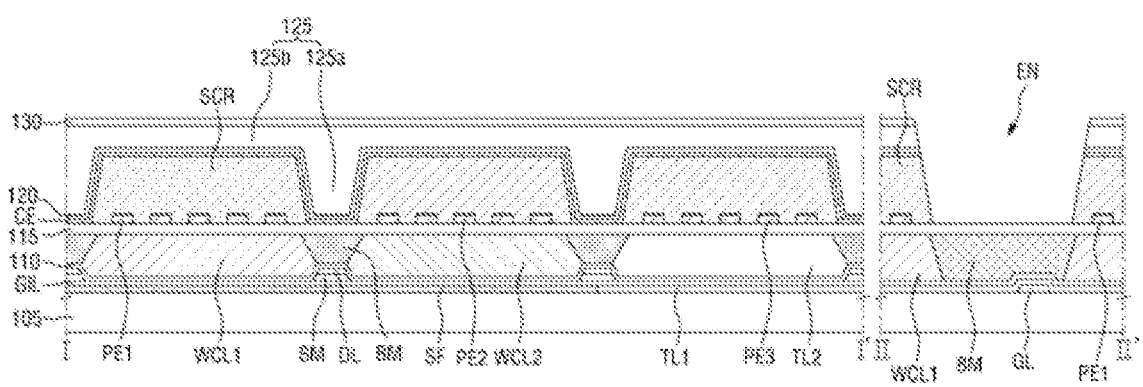

Referring to FIG. 12, a liquid crystal inlet EN is formed in a portion of the cover layer 125 which is formed along a first direction of the substrate 105 and overlaps the gate line GL. That is, the liquid crystal inlet EN is formed on a side surface of each of the sidewalls 125a of the cover layer 125. The liquid crystal inlet EN may be formed by a photolithography process. Here, the third passivation layer 130, the second passivation layer 120, and the common electrode CE may be partially removed.

Figure 13:
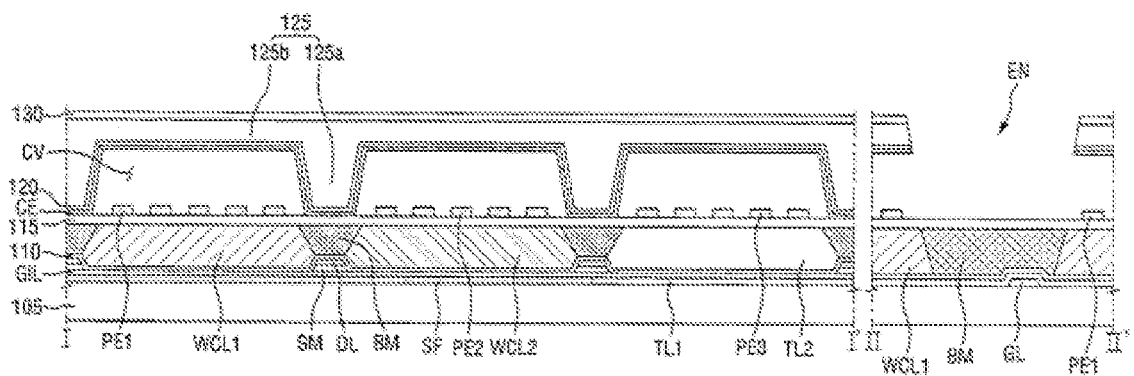

Referring to FIG. 13, the sacrificial layer SCR is removed, thereby forming cavities CV. The cavities CV are spaces into which the liquid crystal molecules LC (see FIG. 2) and dichromatic dye DD (see FIG. 2) are injected. The removal of the sacrificial layer SCR may be accomplished by an etching process and a strip process.

Figure 14:
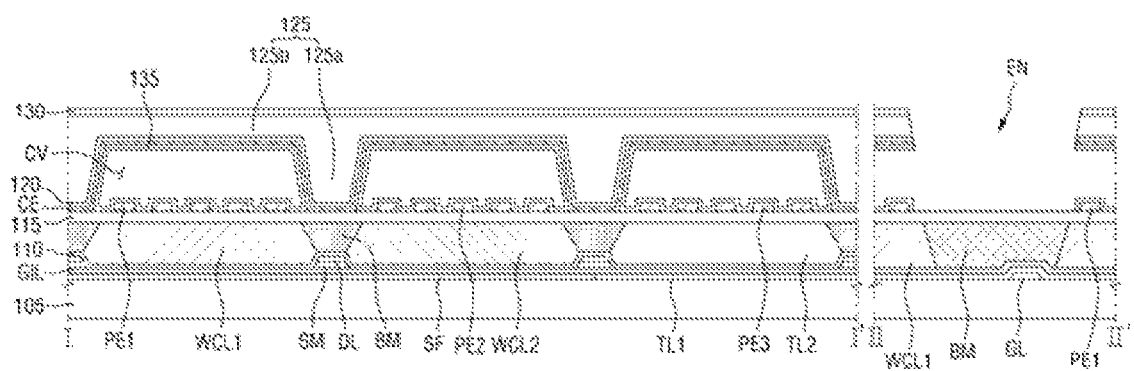

Referring to FIG. 14, an alignment layer 135 is formed on the pixel electrodes PE1 through PE3 and the common electrode CE along inner walls of the cavities CV. The alignment layer 135 may be formed of a liquid crystal alignment material such as polyamic acid, polysiloxane or polyimide by using an inkjet process.

Figure 15:
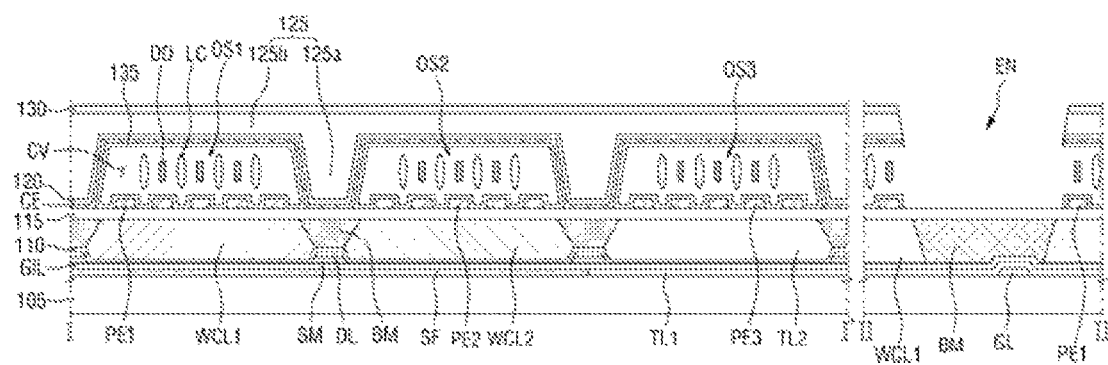

Referring to FIG. 15, a plurality of optical shutters OS1 through OS3 are formed by injecting the liquid crystal molecules LC and the dichromatic dye DD into each of the cavities CV through the liquid crystal inlet EN.

Figure 16:
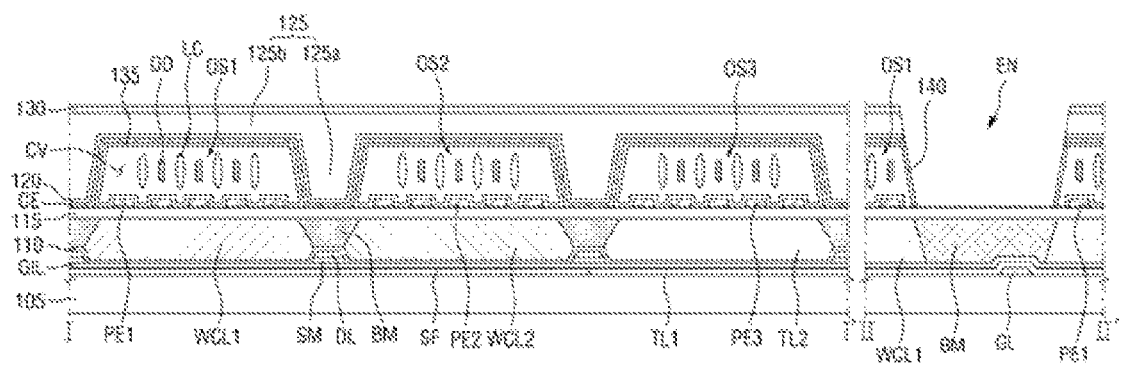
Figure 17:
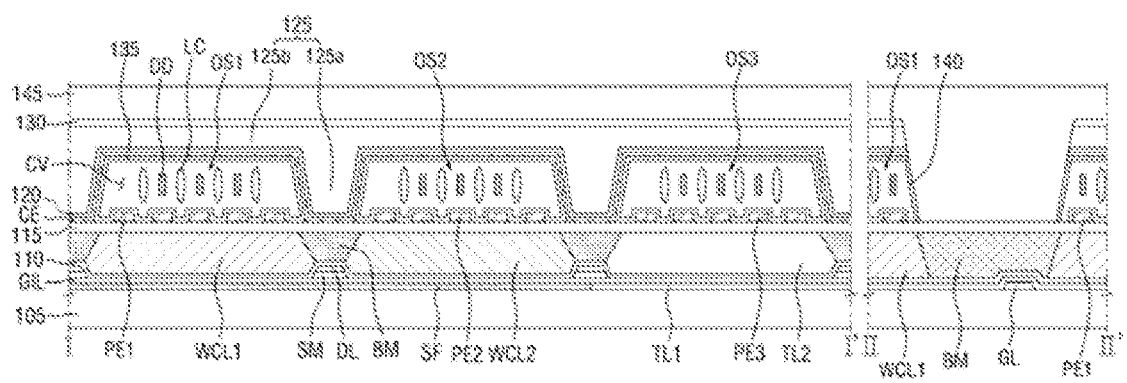

Referring to FIG. 16, a sealing layer 140 is formed to close the liquid crystal inlet EN of each of the cavities CV. The sealing layer 140 may be formed of a sealing material that does not react with the liquid crystal molecules LC and the dichromatic dye DD injected into the cavities CV.

Referring to FIG. 11, a planarization layer 145 is formed on the cover layer 125. The planarization layer 145 may be formed of an insulating material using a deposition method.

Although not illustrated in the drawings, the method of fabricating the LCD 100 may further include forming an encapsulation layer on the planarization layer 145. The encapsulation layer may negate the need for another substrate, which is coupled to the substrate 105 having the thin-film transistor TFT, from the LCD 100.

Although not illustrated in the drawings, a light source LS (see FIG. 2) may be placed above the planarization layer 145.

Figure 18:
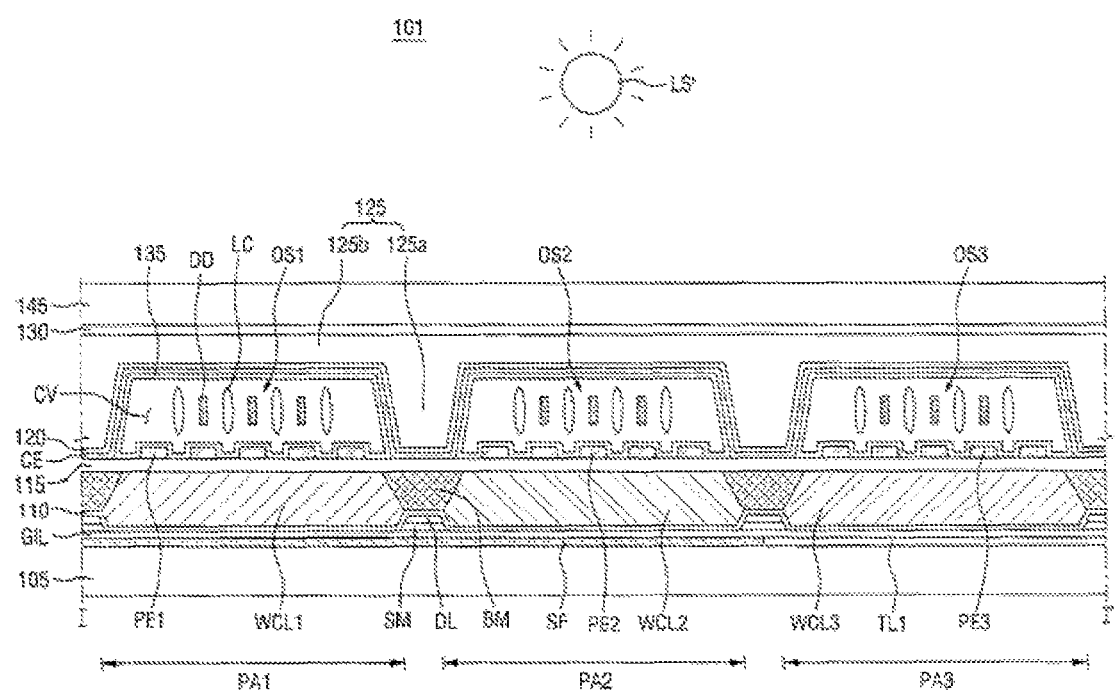
FIG. 18 is a cross-sectional view of an LCD according to another embodiment.

FIG. 18 is a cross-sectional view of an LCD 101 according to another embodiment. For simplicity, a description of elements substantially identical to those illustrated in the above-described drawings will be omitted.

Referring to FIG. 18, a light source LS' of the LCD 101 may emit UV light. Accordingly, it is required to convert the UV light into blue light in a third pixel area PA3. Therefore, a third wavelength conversion layer WCL3 may be used instead of a second transparent layer TL2 (see FIG. 2).

The third wavelength conversion layer WCL3 may be located on the third pixel area PA3 of a substrate 105. The third wavelength conversion layer WCL3 may be located on the same layer as a first wavelength conversion layer WCL1 and a second wavelength conversion layer WCL2. The third wavelength conversion layer WCL3 may receive first light having a first wavelength from the light source LS' and output fourth light having a fourth wavelength which is longer than the first wavelength and is different from a second wavelength and a third wavelength. The first light may be, but is not limited to, UV light, and the fourth light may be, but is not limited to, blue light. Accordingly, a third optical shutter OS3 can adjust the transmittance of the first light or the fourth light.

The third wavelength conversion layer WCL3 may include a phosphor corresponding to a third color (e.g., blue), quantum dots corresponding to the third color, or a combination of the same. That is, the color of light that passes through the third wavelength conversion layer WCL3 may be converted into the third color. The third wavelength conversion layer WCL3 may be formed of substantially the same material as the first wavelength conversion layer WCL1, except that it includes a wavelength conversion material corresponding to blue.

Figure 19:
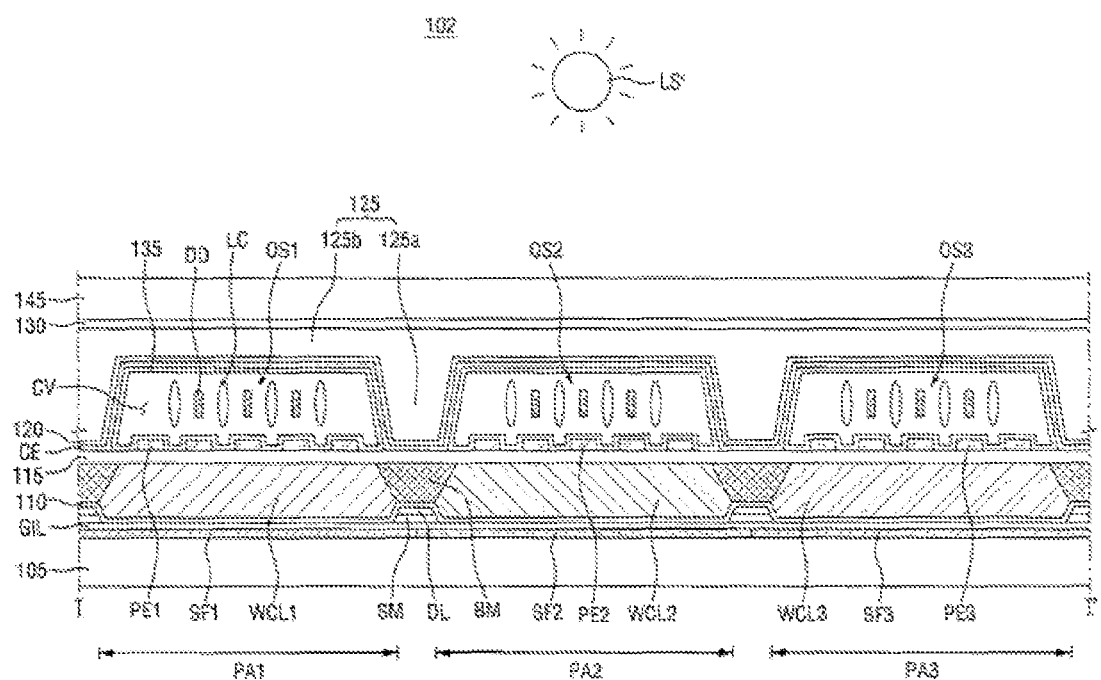
FIG. 19 is a cross-sectional view of an LCD according to another embodiment.

FIG. 19 is a cross-sectional view of an LCD 102 according to another embodiment. For simplicity, a description of elements substantially identical to those illustrated in the above-described drawings will be omitted.

Referring to FIG. 19, the LCD 102 may include a first selective light pass filter SF1, a second selective light pass filter SF2, and a third selective light pass filter SF3.

The first selective light pass filter SF1 may overlap a first wavelength conversion layer WCL1 on a first pixel area PA1 and may be located on a path of a second light. The first selective light pass filter SF1 may reflect a first light, e.g., from the light source LS', and transmit the second light only. Here, the first light may be, but is not limited to, UV light, and the second light may be, but is not limited to, red light. The first selective light pass filter SF1 may be formed by alternately stacking two insulating layers 110 having different refractive indices, but the inventive concept is not limited thereto.

The second selective light pass filter SF2 may overlap a second wavelength conversion layer WCL2 on a second pixel area PA2 and may be located on a path of third light. The second selective light pass filter SF2 may reflect the first light and transmit the third light only. Here, the first light may be, but is not limited to, UV light, and the third light may be, but is not limited to, green light. The second selective light pass filter SF2 may be formed by alternately stacking two insulating layers 110 having different refractive indices, but the inventive concept is not limited thereto.

The third selective light pass filter SF3 may overlap a third wavelength conversion layer WCL3 on a third pixel area PA3 and may be located on a path of fourth light. The third selective light pass filter SF3 may reflect the first light and transmit the fourth light only. Here, the first light may be, but is not limited to, UV light, and the fourth light may be, but is not limited to, blue light. The third selective light pass filter SF3 may be formed by alternately stacking two insulating layers 110 having different refractive indices, but the inventive concept is not limited thereto.

Embodiments provide at least one of the following features.

That is, since a polarizer and a color filter are not required, an optical loss caused by the polarizer and the color filter can be avoided.

In addition, a wavelength conversion layer formed of a phosphor or quantum dots can improve high color reproducibility.

Further, an optical shutter is placed within a cavity formed on one sheet of substrate. Thus, a thin LCD can be provided.

However, the effects of the inventive concept are not restricted to the one set fort herein. The above and other effects of the inventive concept will become more apparent to one of daily skill in the art by referencing the claims.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the present embodiments be considered in all respects as illustrative and not restrictive, reference being made to the appended claims rather than the foregoing description to indicate the scope of the inventive concept.

What is claimed is:

1. A liquid crystal display (LCD) comprising:
a light source configured to provide a first light having a first wavelength;
a first wavelength conversion layer configured to convert the first light into a second light having a second wavelength longer than the first wavelength;
a first optical shutter which overlaps the first wavelength conversion layer, is configured to adjust transmittance of the first light or the second light, and comprises liquid crystal molecules and dichromatic dye;
a second wavelength conversion layer which is located on the same layer as the first wavelength conversion layer and is configured to convert the first light into a third light having a third wavelength longer than the first wavelength and different from the second wavelength;
a second optical shutter which overlaps the second wavelength conversion layer, is configured to adjust transmittance of the first light or the third light, and is formed of substantially the same material as the first optical shutter;
a transparent layer which is located on the same layer as the first wavelength conversion layer and the second wavelength conversion layer and is formed of a transparent material; and
a third optical shutter which overlaps the transparent layer, is configured to adjust the transmittance of the first light, and is formed of substantially the same material as the first optical shutter.

2. The LCD of claim 1, wherein the first wavelength conversion layer comprises quantum dots or a phosphor.

3. The LCD of claim 1, further comprising a pixel electrode which faces a common electrode with the first optical shutter interposed therebetween, wherein light transmittance of the first optical shutter varies according to a voltage difference between the pixel electrode and the common electrode.

4. The LCD of claim 1, further comprising a selective light pass filter which is located on a path of the second light, is configured to reflect the first light, and is configured to transmit the second light.

5. The LCD of claim 1, further comprising a selective light pass filter which is located on a path of the third light, is configured to reflect the first light, and is configured to transmit the third light.

6. The LCD of claim 1, further comprising a long wavelength pass filter which is located on a path of the second light and a path of the third light, is configured to reflect the first light, and is configured to transmit the second light and the third light, wherein the long wavelength pass filter is not located in an area which overlaps the transparent layer.

7. The LCD of claim 1, wherein the light source is configured to provide ultraviolet (UV) light or blue light.

8. A liquid crystal display (LCD) comprising:
a first pixel area which is defined in a substrate;
a first wavelength conversion layer which is located on the first pixel area and comprises quantum dots or a phosphor configured to convert, a color of light incident upon the first pixel area into a first color;

a first optical shutter which overlaps the first wavelength conversion layer and comprises liquid crystal molecules and dichromatic dye;
a second pixel area which is defined in the substrate and different from the first pixel area;
a second wavelength conversion layer which is located on the second pixel area and comprises quantum dots or a phosphor configured to convert a color of light incident upon the second pixel area into a second color different from the first color;
a second optical shutter which overlaps the second wavelength conversion layer and is formed of substantially the same material as the first optical shutter;
a third pixel area which is defined in the substrate and different from the first pixel area and the second pixel area;
a transparent layer which is located on the third pixel area and is formed of a transparent material; and
a third optical shutter which overlaps the transparent layer and is formed of substantially the same material as the first optical shutter.

9. The LCD of claim 8, further comprising:
a pixel electrode which is located on a side of the first optical shutter;
wherein a common electrode which is located on an other side of the first optical shutter, is insulated from the pixel electrode, and defines a cavity between the pixel electrode and the common electrode,
wherein the first optical shutter is located within the cavity.

10. The LCD of claim 9, further comprising a cover layer which covers the common electrode and seals the cavity.

11. The LCD of claim 8, further comprising a selective light pass filter which is located between the substrate and the first wavelength conversion layer and between the substrate and the second wavelength conversion layer, is configured to reflect light of a third color, and is configured to transmit light of the first color and light of the second color, wherein the selective light pass filter is not located on the third pixel area.

12. A method of fabricating a liquid crystal display (LCD), the method comprising:
providing a first light having a first wavelength;
forming a first wavelength conversion layer, which comprises quantum dots or a phosphor, on a pixel area of a substrate, the first wavelength conversion layer converting the first light into a second light having a second wavelength longer than the first wavelength;
forming a first optical shutter which overlaps the first wavelength conversion layer, is configured to adjust transmittance of the first light or the second light, and comprises liquid crystal molecules and dichromatic dye;
forming a second wavelength conversion layer which is located on the same layer as the first wavelength conversion layer and is configured to convert the first light into a third light having a third wavelength longer than the first wavelength and different from the second wavelength;
forming a second optical shutter which overlaps the second wavelength conversion layer, is configured to adjust transmittance of the first light or the third light, and is formed of substantially the same material as the first optical shutter;
forming a transparent layer which is located on the same layer as the first wavelength conversion layer and the second wavelength conversion layer and is formed of a transparent material; and
forming a third optical shutter which overlaps the transparent layer, is configured to adjust the transmittance of the first light, and is formed of substantially the same material as the first optical shutter.

13. The method of claim 12, further comprising, after the forming of the first wavelength conversion layer:
forming a pixel electrode on the first wavelength conversion layer;
forming a sacrificial layer on the pixel electrode;
forming a common electrode on the sacrificial layer;
forming a cover layer on the common electrode to cover the common electrode; and
forming a cavity between the pixel electrode and the common electrode by removing the sacrificial layer,
wherein the first optical shutter is located within the cavity.

14. The method of claim 12, further comprising, before the forming of the first wavelength conversion layer, forming a selective light pass filter, which transmits the second light only, on the substrate.

* * * * *